Feb. 8, 1938.  K. DAVIS  2,107,602
PROCESS AND MECHANISM FOR SEPARATING INTERMIXED DIVIDED MATERIALS
Filed June 25, 1925   8 Sheets-Sheet 4

INVENTOR
K. Davis
BY
John D. Morgan
ATTORNEY

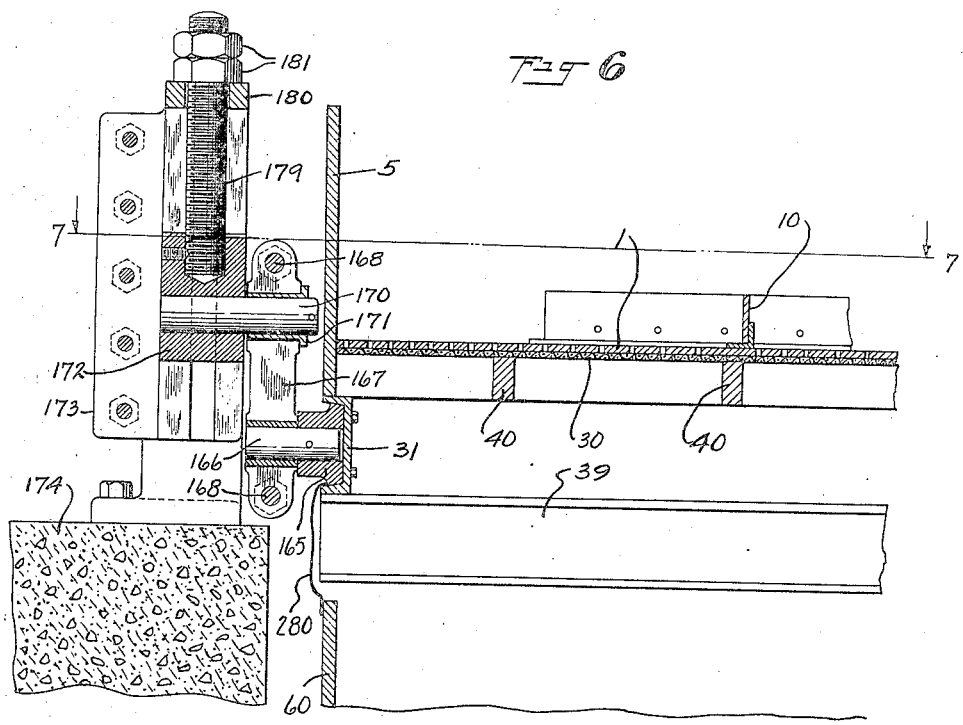
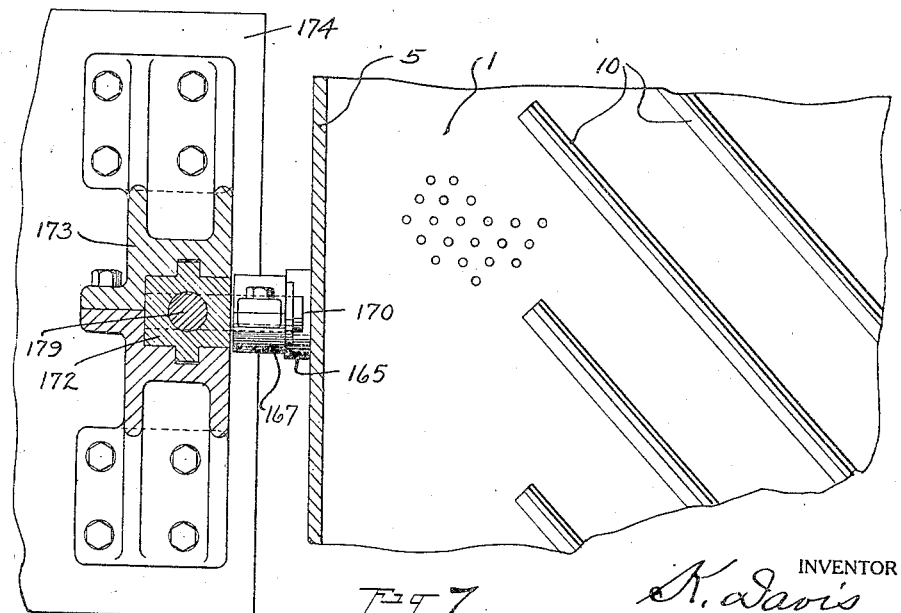

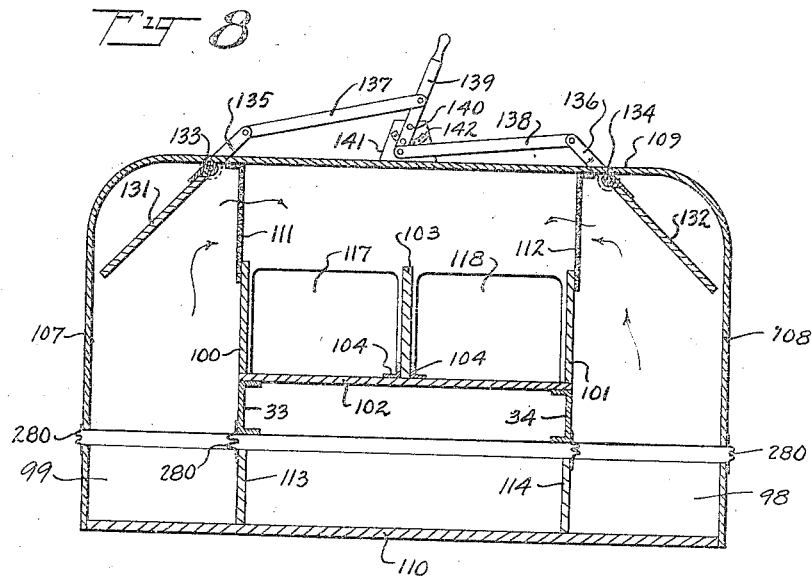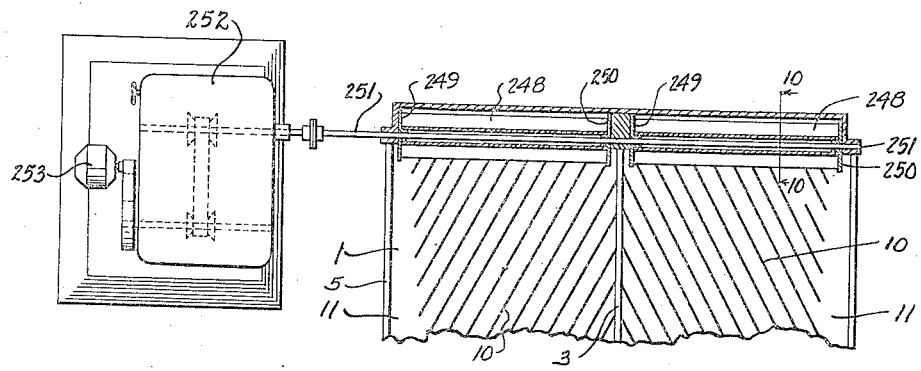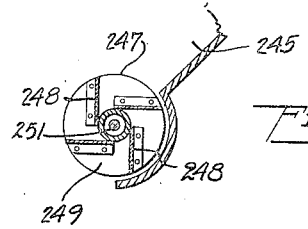

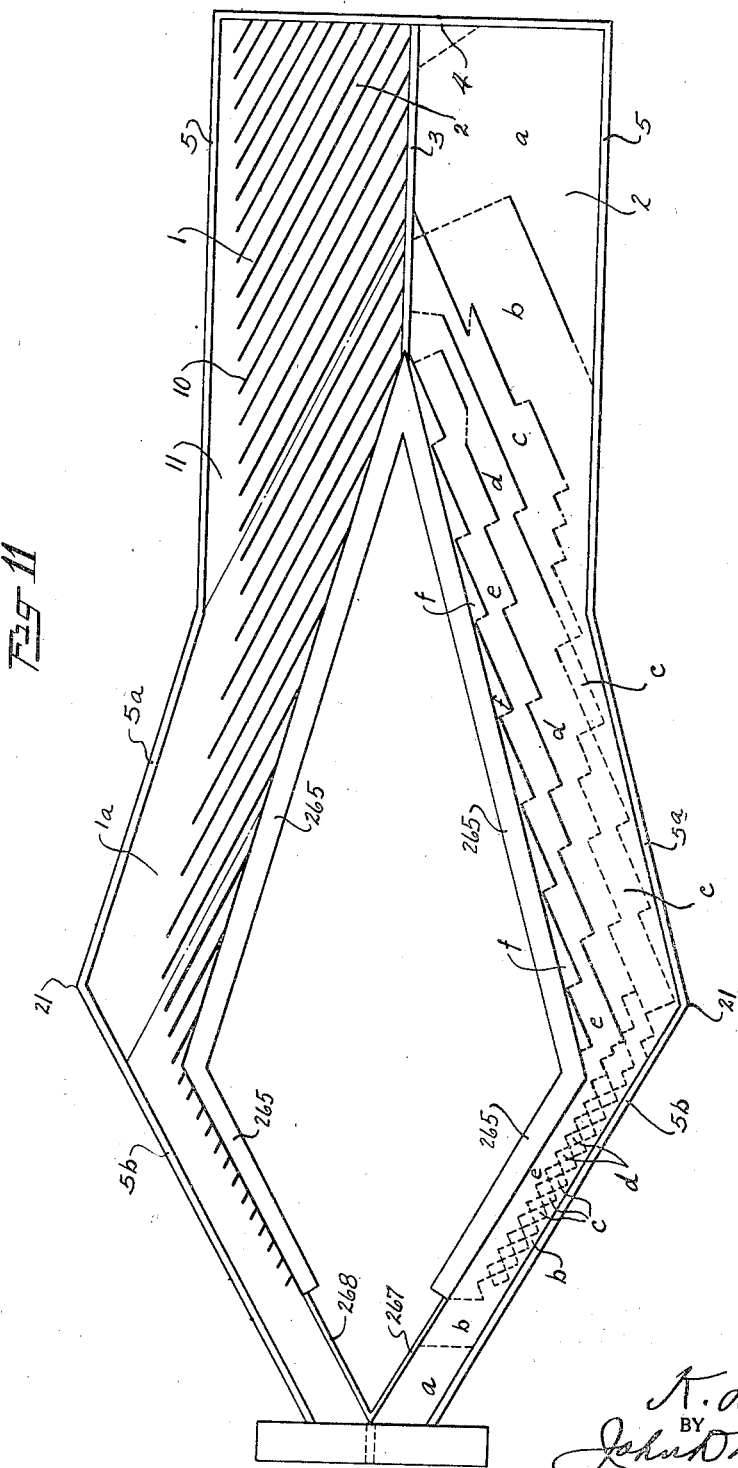

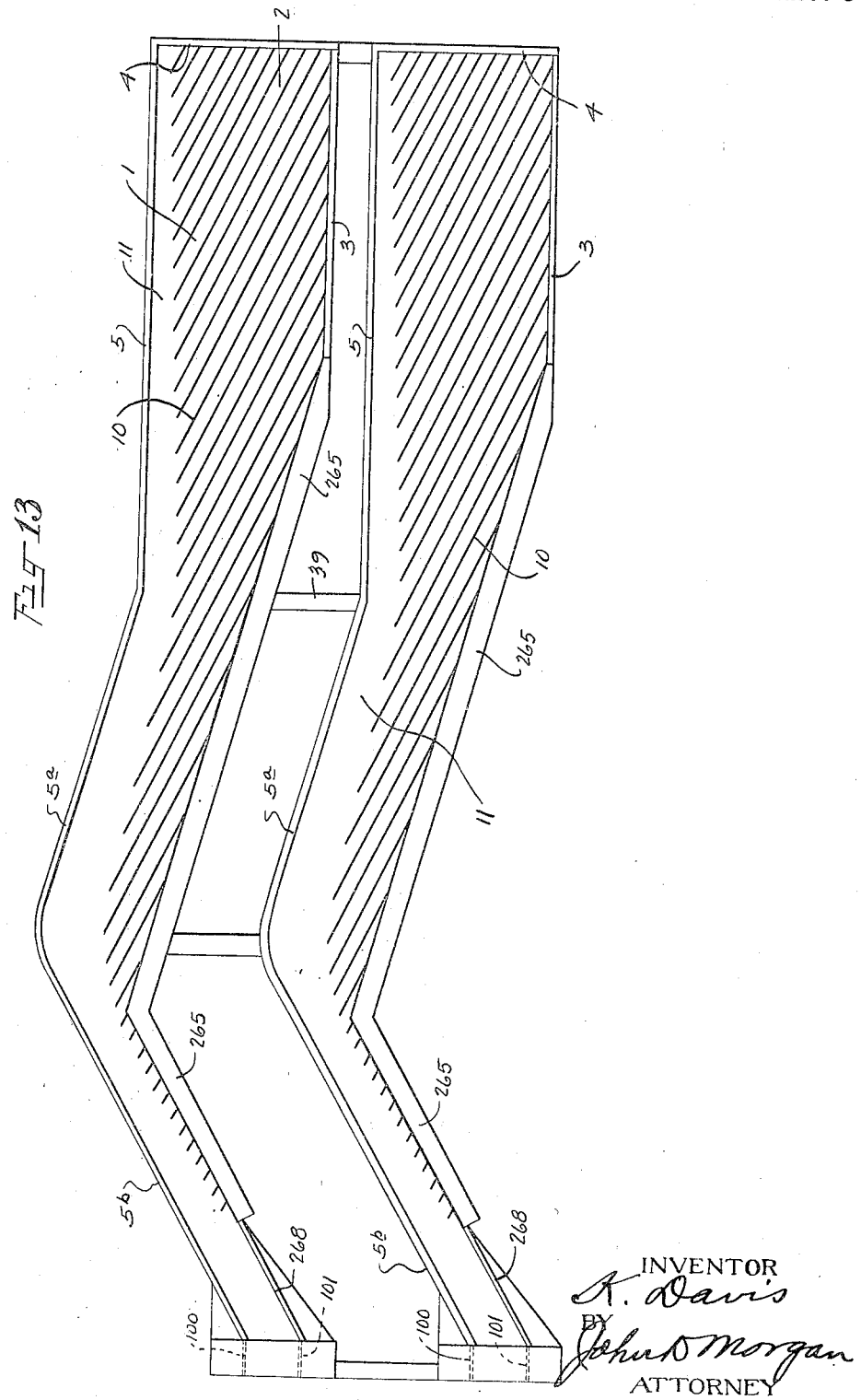

Patented Feb. 8, 1938

2,107,602

UNITED STATES PATENT OFFICE 2,107,602

PROCESS AND MECHANISM FOR SEPARATING INTERMIXED DIVIDED MATERIALS

Kenneth Davis, Edensburg, Pa., assignor, by mesne assignments, to Peale-Davis Company, Wilmington, Del., a corporation of Delaware Application June 25, 1925, Serial No. 39,432

22 Claims. (Cl. 209—467)

The invention is directed to a novel and useful process and mechanism for separating intermixed divided materials of different specific gravities; and more particularly to a process and mechanism for separating such materials which vary relatively greatly in the size of the intermixed fragments or particles, while on the other hand, varying relatively little in their specific gravities.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 6 is a fragmentary vertical section, greatly enlarged, taken on the line 6—6 of Fig. 2, looking in the direction of the arrows;

Fig. 7 is a fragmentary top plan, with parts in section, taken on the line 7—7 of Fig. 6;

Fig. 8 is a vertical transverse section, greatly enlarged, taken on the line 8—8 of Fig. 2, looking in the direction of the arrows;

Fig. 9 is a fragmentary enlarged top plan, with parts in section, taken on the line 9—9 of Fig. 1;

Fig. 10 is a transverse vertical section, greatly enlarged, taken on the line 10—10 of Fig. 9, looking in the direction of the arrows;

Fig. 11 is an enlarged plan, somewhat diagrammatic in character, of the table only, shown in Fig. 2, and illustrating the preferred arrangement of air pressure zoning;

Fig. 12 is a fragmentary plan showing a modification in a part of the table; and Fig. 13 is a top plan of the table only, showing a different arrangement of the two tables.

Fig. 14 is a small scale, diagrammatic elevation, showing the general structure of the dust collector.

Figure 1:
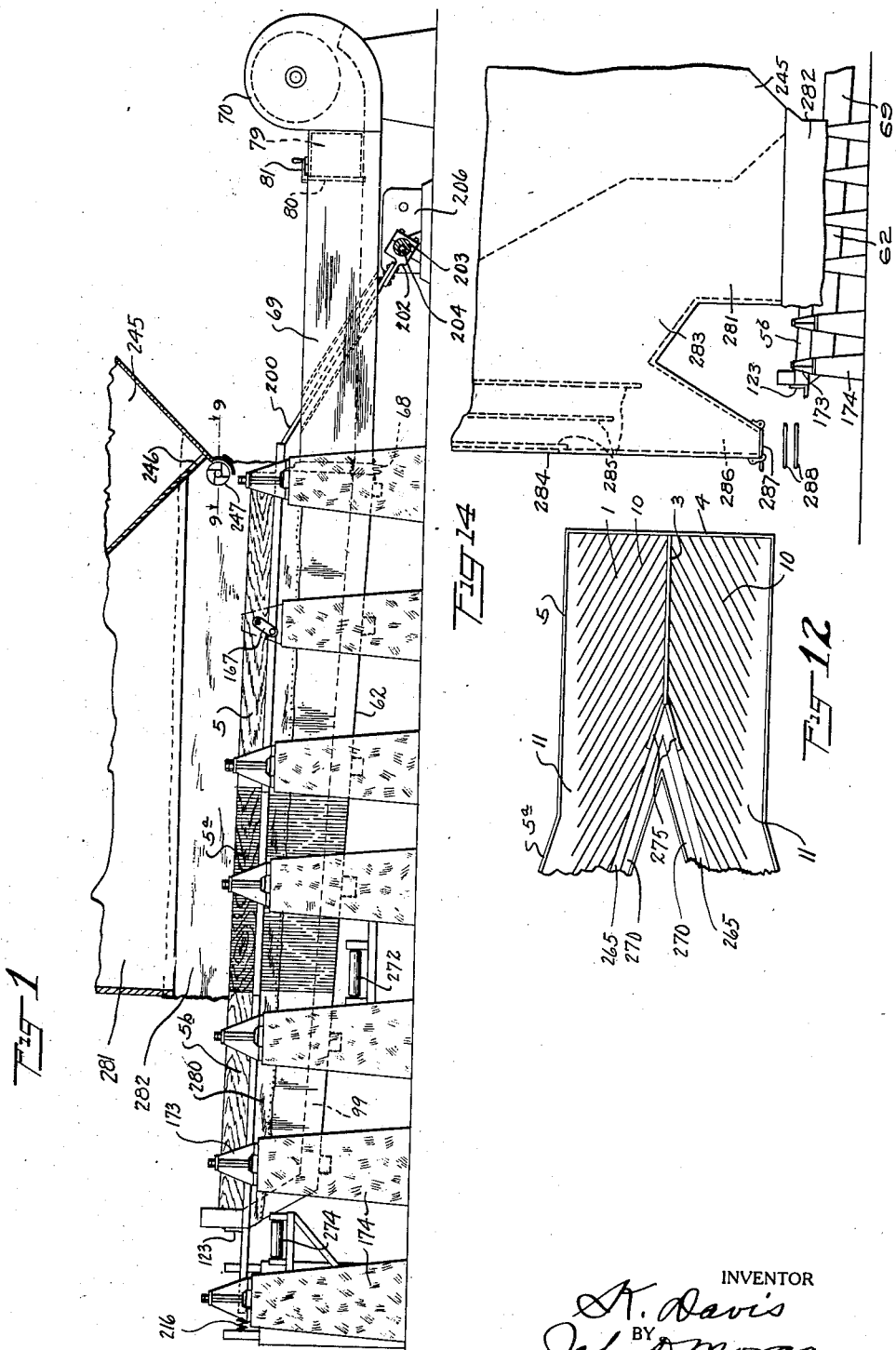
Fig. 1 is a side elevation of a mechanism constructed in accordance with the invention.

The invention comprises a process and mechanism for separating intermixed divided materials, and delivering the different separated materials apart from each other and free from intermixture. The invention is directed more particularly to providing an improved process and mechanism whereby intermixed materials are successfully separated, wherein the fragments or particles of the various materials vary very greatly in size, and wherein the various intermixed materials differ relatively but little in their specific gravities; the rapid and successful commercial separation thereof thus presenting a very difficult problem.

The expression "intermixed divided materials" is used for convenience herein in designating a mixture comprising two or more materials in granular, fragmentary, pulverulent, or other like state, whether natural or due to previous handling or operations. The expressions "heavier" and "lighter", as applied to the materials, pertain to relative specific gravities, and are so used for convenience.

An example of materials, in the mechanical conditions and having the physical properties already described, is a mixture of coal, "bone", and rock and other impurities, as it comes from the mine, and the present invention in actual practice has been chiefly directed to the automatic cleaning of the coal as it comes out of the mine, and without previous preparation or handling.

One of the principal and most valuable features of my process and mechanism is, the ability to practically completely separate coal, "bony" and rock without the preliminary "sizing" which has heretofore been necessary, and which constitutes a tremendous and practically prohibitive item of labor and expense. By my invention, I am enabled to practically complete the separation of the coal, "bony" and rock, as it comes from the mine, from the finest dust up to pieces three inches in dimension, by a single operation and by running it in very large volume over merely a single cleaning table, the coal going direct to the cars, and the rock to the rock heap, and the bony being handled in any way desired.

According to previous commercial practice, except by the cleaning tables disclosed in and covered by certain of my copending applications, it has been necessary to very closely size the coal by preliminary screening before attempting the automatic separation of the intermixed coal, bony and rock.

As an example of necessary previous commercial screening preparatory to separating:—All sizes above two inches were screened out; from two inches to 1 and ½ inches were screened as the next size; then from 1½ inches to 1 inch; from 1 inch to ½ inch; from ½ inch to ¼ inch; from ¼ inch to ⅛ inch; from ⅛ inch to 1/16 inch; and from 1/16 inch down were screened out on successive screens. Each of these sizes is then sent to a different separating table. Thus seven or eight different screens are required and seven or eight separating tables, one for each different size of the intermixed materials produced by screening, making about fourteen or more machines and operations in all.

By my invention, I dispense with all of the screening mechanisms of the prior art and with all but one of the separating tables. I use only a single large separating table, and over this single table I send the unprepared, intermixed materials, which prior to my invention were necessarily sent first over the several screening mechanisms, and then over the corresponding separating tables, as described in the preceding paragraphs. I am able on this one table to practically completely separate the coal, rock, and bony and other impurities from three inches in dimension down to the finest dust.

My invention is applied to the separation of a continuous and forwardly flowing bed of the intermixed, divided materials, such as the unsized mixture of coal, bony and rock, the bed of materials undergoing separation being supported upon an air pervious table, through which a blast of air is driven from beneath upwardly through the bed of material, the table at the same time being moved or reciprocated to mechanically forward the separated heavier material, which has settled down upon the table, by friction and inertia toward a place of delivery, the gradation of the force of the air current and the table structure cooperating in the novel manner hereinafter set forth to accomplish the desired result.

The invention provides broadly for feeding-on the material at a locus which is at or near the rear end of the separating table, and preferably entirely across this end, at such rate as to build up at the beginning, and thereafter to continuously maintain, upon the table a bed of materials of substantially uniform thickness, which moves gradually forwardly over the table. The materials undergo progressive separation, due to the combined air and mechanical actions, as they move forwardly, gradually approaching complete separation, which is effected before the separated materials are delivered from the table.

By my present invention, the intermixed materials are fed on preferably entirely across the rear end of the air pervious table, and beginning at this point and continuing progressively forwardly along the table, the intermixed particles or fragments of material are loosened apart and separated from each other, and the lighter material gradually forms a flotant top stratum, and the heavier material gradually settles and comes to rest upon the table, and thereafter is progressed forwardly by the combined action of friction and inertia to a place of delivery.

Broadly considered, in connection with the foregoing, the process and table of my present invention, in addition to creating this superior flotant stratum of the lighter material, provides also for this stratum traveling forwardly in a straight and unconstrained path and at the end of its straight and unconstrained path, to be delivered from the table, thereby giving the shortest and most natural path to the superior flotant material.

The heavier material which comes to rest upon the table, is acted on by friction and inertia, and is propelled to the side of the table as soon as possible, and then is progressed in a continuous and unmixed stream forwardly along this one edge of the table to a place of delivery, without interferring or intermixing with the straight and uninterrupted flow of the lighter superior flotant stratum.

In connection with the foregoing, the air action is cooperatively proportioned and disposed to produce the completest and most satisfactory result in the difficult task of completely, or practically completely, separating the particles of intermixed material of such widely divergent dimensions and so closely related in relative specific gravity. Accordingly, the area or zone of greatest air activity is at or near the place of feeding on of the intermixed materials, and decreases substantially forwardly along the table, and also decreases transversely across the table in the direction of movement of the lighter stratified material, in conjunction with the forward disposition already described.

The general preferred form of the individual tables is shown in Fig. 13, wherein two tables are placed side by side in the same relation. As a matter of mechanical convenience, however, two tables are preferably placed in the relative positions shown in Fig. 2, that is, right and left-handed with respect to each other, whereby a common delivery for two tables may be provided, as a matter of convenience, both for the coal or other lighter material, and for the rock or other heavier material. The operation of the two tables, however, is independent of each other, and is the same as a single table, or of two or more tables arranged as shown in Fig. 13.

Referring now to the embodiment of the invention, illustrated by way of example in the accompanying drawings, the separating table is provided with a bed or deck 1 which is air pervious as already generally described. The rear portion of the table, onto which the intermixed divided materials are fed comprises preferably a rectangular portion 2, extending for quite a distance from the point of feeding-on of the intermixed materials, although this portion of the table may be varied in form. There is preferably provided, however, a considerable forwardly extending reach from the point of feeding on before the beginning of the discharge line or area for the superior flotant lighter material, such as the coal, is reached, whereas the devices operating to separate the inferior and heavier material and to discharge it into a separate channelway begin immediately at the place of feeding on and initial separation of the intermixed materials.

Figure 2:
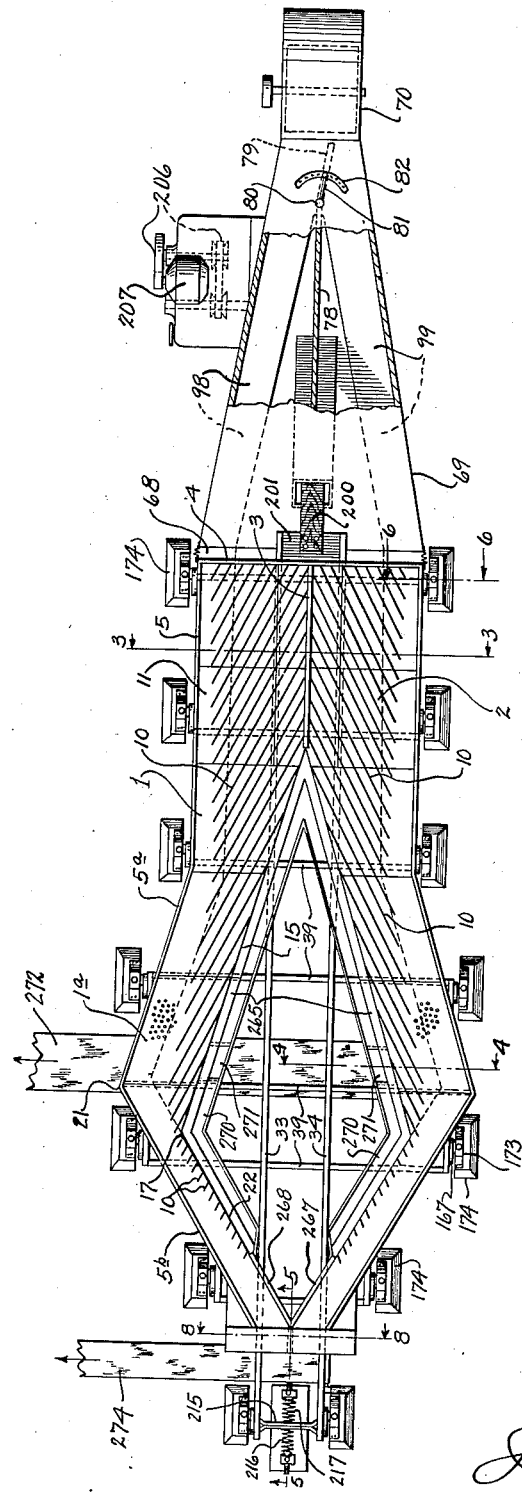
Fig. 2 is a top plan corresponding to Fig. 1 with the feeding hopper omitted.
Figure 3:
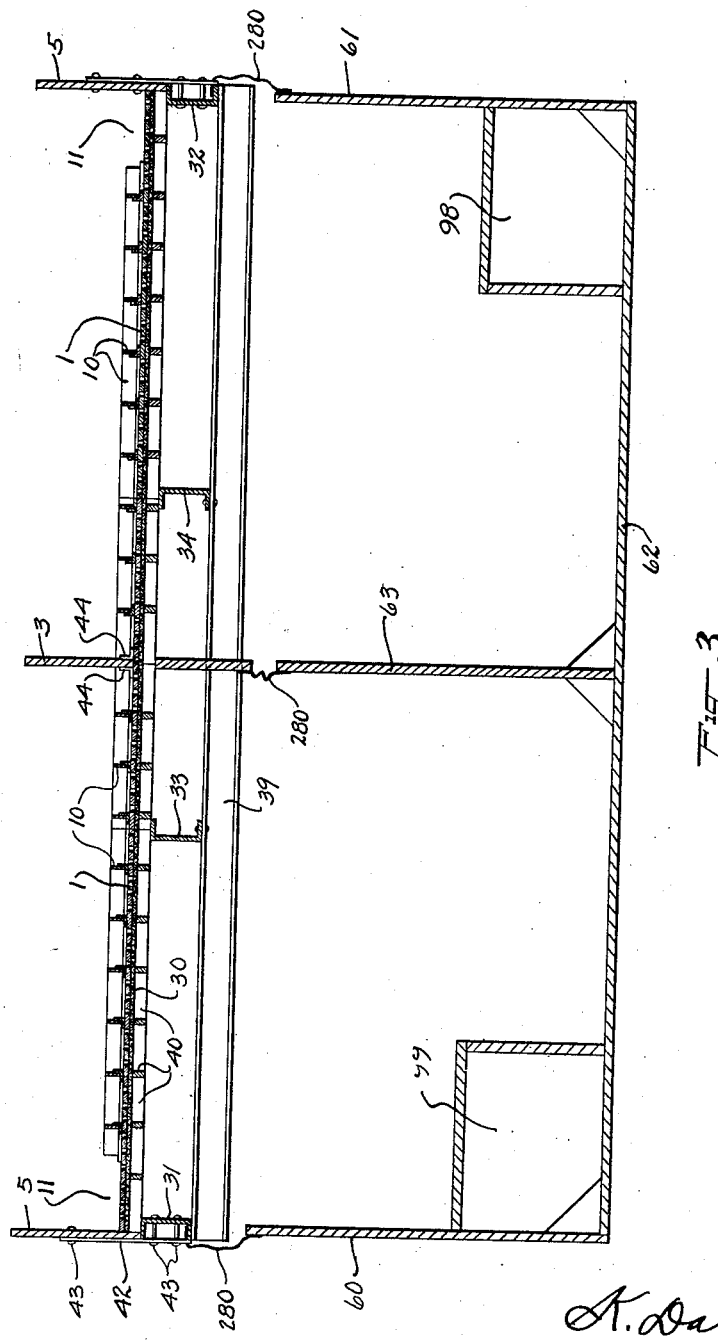
Fig. 3 is an enlarged transverse vertical section on the line 3—3 of Fig. 2.

In accordance with the foregoing features of the invention (Figs. 2, 3, 4, 5 and 6) the rearward portion of the table comprises vertically-disposed retaining walls 3, 4 and 5, resting upon, and extending upwardly from the air-pervious deck or bed 1, and disposed about the rear end and the two sides of this part of the table. The same description will apply to both of the tables as shown in Fig. 2, in so far as the table proper is concerned, and only one table will, therefore, be described. The supporting and reciprocating structure and mechanism, however, is preferably common to both tables, as a matter of mechanical convenience.

Projecting upwardly from the surface of the table or deck 1 are arranged a plurality of separating partitions 10, preferably perpendicular to the table, and which extend forwardly, outwardly and transversely of the table, and are preferably parallelly arranged, as shown in Fig. 2. The separating partitions direct the rock by the shortest practicable path to the side of the table and away from the stream of forwardly traveling lighter material. The first of these separating partitions, beginning at the rear end of the table, that is, close to the place of feeding on of the intermixed materials, abut on the rear, vertically disposed retaining wall 4, and from that wall slant forwardly and outwardly toward the side retaining wall 5. The separating partitions terminate short of the wall 5, so as to leave a clear passage 11 extending forwardly just within and along the wall 5, and between it and the outer ends of the separating partitions. This provides a clear channelway for the already deposited rock which is propelled by friction and inertia, entirely at one side of the separating table, and away from the flow straightforwardly of the superior floating stratum of coal.

The succeeding separating partitions 10, considered forwardly of the table, have their inner ends abutting on the side partition wall 3, and extend forwardly and outwardly transversely toward the side wall or partition 5 in the manner already described. Considered forwardly along the table, however, the successive outer ends of the separating partitions 10 terminate successively a little farther inwardly of the table, so that the channel 11 just within and along the retaining wall 5 gradually widens forwardly along the table to accommodate the increasing volume of rock and other impurities fed thereinto from behind the separating partitions during the operation of the table.

The superior flotant stratum of coal, which moves straight ahead, forwardly along the table, is delivered therefrom along a transversely disposed edge 15, which preferably begins at the forward end of the side retaining wall 3, and extends transversely forwardly and outwardly, and preferably at something of a lesser inclination to the longitudinal line of the table than the separating partitions 10, as clearly shown in Fig. 2. The forward and outer end 17 of this delivery edge 15 is just outside, transversely considered, the line of the longitudinally disposed retaining side wall 5. There is thus provided a long, transversely disposed delivering edge for the lighter material, extending the full width of the stream of coal or other lighter material.

For the purpose of completing the final separation of the intermixed materials, and also to provide for carrying the rock or other heavier material forwardly to delivery at the front of the table, while avoiding any disturbance or deflection of the forwardly moving superior stratum of coal, the table is angled forwardly and outwardly from a point beginning somewhat forwardly of the rear end of the delivery edge 15 for the coal, or other lighter superior flotant stratum. Accordingly, the outer retaining wall 5 has an outwardly and forwardly inclined portion 5ª, adjoining, and continuous with, the front end of the part 5, and continuing along the outer edge of the correspondingly angled part of the air pervious table or deck 1ª.

The separating partitions 10 along this part, have their inner ends at the discharge edge 15 for the coal, and are preferably parallel to the separating partitions on the rearward parts of the table, and also terminate short of the outside retaining wall 5ª, so as to continue the gradual widening of the free rock channel 11ª along the outside of the table.

Both as a matter of convenience, where the tables are used double in right and left hand relation, as shown in Fig. 2, and also with certain classes of materials, to advantageously effect a final separation of the last remnants of the lighter material from the now relatively great mass of rock, or other heavier material, the forward end of the table is preferably angled in the opposite direction, and is inclined forwardly and inwardly, the table also narrowing in the general forward direction. The table is so shown from the point 17 on the inside, and a corresponding point 21 on the outside, with its front end, the place of delivery of the rock, substantially in line with the retaining wall 3, constituting one side of the rear portion of the separating table.

This portion of the table has a preferably approximately horizontally disposed delivery edge 22 for the coal or other lighter material, which is inclined forwardly and inwardly. There is an outer retaining wall 5ᵇ, likewise forwardly and inwardly inclined, and constituting a continuation of the forward end of the wall 5ª. This narrow portion of the table is likewise preferably provided with forwardly and outwardly disposed separating partitions 10, which may be parallel to those to the rear, and which naturally are exceedingly short.

The rock is delivered preferably from the unobstructed forward end beyond the last of the short separating partitions, and in the arrangement of two tables together shown in Fig. 2, there is a common rock delivery for both tables. Preferably also there is a final safeguard, comprising an air box, for separating out any exceedingly small proportion of coal which may be left still in the general mass of rock, as will be later described.

Referring now in detail to the particular structure of the foregoing mechanism, the table or deck 1 preferably comprises a perforate metal plate, or rather a large number of plates, closely abutting at their edges, the degree of air perviosity desired being attained by the number of holes in any unit area and the size of the holes. These factors are regulated to accomplish the best results with the particular materials to be separated on the table. There is preferably or optionally provided also, a layer of wire mesh 30 underneath the perforate plate 1, although this may be dispensed with as desired.

The table bed is supported upon a suitable structure comprising, as embodied, outside channel bars 31 and 32, shaped to conform to the outer edge of the tables (see Figs. 1, 3, 4, 6 and 8), and central longitudinally disposed channel bars 33 and 34, the bars 31 and 32 being riveted or bolted to the bars 33 and 34 near their forward ends. Additional channel bars 35, lying beneath the respective inner edges of the angled (forward) part of the tables are also preferably provided (Fig. 4), and these are fastened by rivets or bolts at both ends to the channel bars 33 and 34.

The various longitudinally disposed channel bars already described rest upon and are fixed to a series of transversely-disposed channel bars 39, spaced apart at different points along the table, and fastened to the longitudinal channel bars by bolts or rivets. A series of transversely disposed floor sills or supporting strips 40 rest upon the tops of the longitudinally disposed channel bars, and directly support the air pervious deck 1, and are preferably located beneath the separating partitions.

The vertically disposed side walls 3, 4 and 5, at the exterior edges of the table, are fastened to the structure just described in a suitable manner, and as shown, straps 42 are riveted to the walls 4 and 5 and to the channel bars of the frame by rivets 43. In the case of two tables mounted together, the central wall 3 may be common to both tables and may be supported and held in place by angle strips 44 resting upon the top of the table and fastened to the table and to either side of the wall 3 along the bottom edge thereof.

The embodied form of means for providing the air currents (Figs. 1, 2, 3, 4 and 8), comprises an air chamber extending substantially beneath all parts of the table, and shaped to conform to the shape of the table, and as embodied, comprises side walls 60 and 61, and a bottom 62, and in the case of the two tables placed together, a common central air-tight partition 63. In the present embodiment, the air chest is stationary, and accordingly the upper edges of its vertical walls are connected to the bottom of the reciprocable table structure by air-tight, flexible strips 280 (Figs. 1, 3, 4, 6 and 8). A flexible air-tight connection 68 is also preferably provided at the rear end of the air chamber, with which communicate the air duct 69 coming from a blower 70 or other source of air current or air pressure.

In the case of the two tables being mounted and operated conjointly, as shown in Fig. 2, means are provided for supplying air to either table separately, or when both are operated together for regulating the force of the air action for either table. For this purpose, as embodied (Figs. 1 and 2), a vertical central partition 78 is provided in the air duct 69, beginning at the rear wall of the air chamber and terminating a little space in front of the fan 70. A leaf valve or shutter 79, vertically disposed, is provided within the air duct 69, at the rear end of the partition 78, and is pivotally mounted at its rear vertical edge on a shaft 80, with its free edge pointing toward the fan.

The shaft 80 of the shutter 79 extends outside the duct 69, and is preferably provided with a handle 81, which cooperates with an arcuate positioning and holding plate 82. The passage from the fan to either side of the partition 78 may be entirely closed off, thus shutting off the air entirely from either table; or it may be partially closed off, thereby creating a relatively greater air pressure through one of the tables and a relatively lesser air pressure through the other table.

Means are provided by the invention for producing a backward and upward air pressure at the forward end of the table, for the purpose of finally separating any small quantities of coal which might possibly be still intermingled with the great mass of rock near the place of discharge. According to one feature of the invention, an air box is provided with a separate air supply, and will be described as applied to the two tables positioned together as shown in Fig. 2. In this embodiment (Figs. 1, 2 and 8), two separate air ducts 98 and 99 are provided, preferably beginning close to the blower, or other source of air current or air pressure 70. They thus receive a quantity or volume of the rapidly moving air and their cross-sectional area is proportioned to secure the desired air action at the delivery end. These ducts extend along the lower and outer edge of either part of the air duct 69 and continue along in the same position in either compartment of the air chamber under each of the tables, and deliver their air currents to the air box at the forward end of the table, which will now be described. The air pressure may be varied and regulated in the various air ducts and air chambers as desired and by any known or suitable means.

In the form shown in Fig. 2, wherein a right-handed and left-handed table are used together, a common air box may be employed. As shown, the free front end of the table has the front ends of the outside retaining walls 5b connecting to two vertically disposed side walls 100 and 101, the side walls projecting upwardly from the outer edges of a floor 102, which is mounted on the longitudinal frame beams 33 and 34. This floor 102 may be air pervious if desired, but is preferably impervious, and is so shown in Fig. 8.

Figure 5:
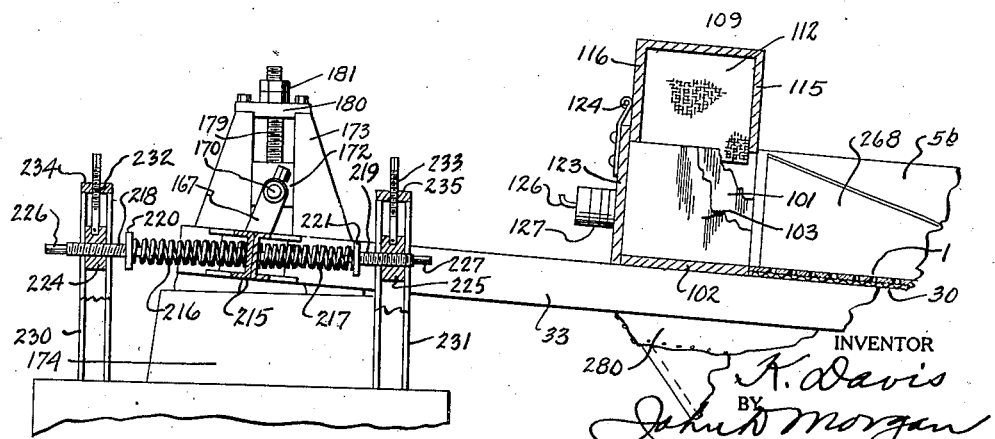
Fig. 5 is a vertical, longitudinal section, greatly enlarged, taken on the line 5—5 of Fig. 2, looking in the direction of the arrows.

A vertically extending central partition 103 is preferably provided along the center of the air box, this partition being fastened to the floor 102 by suitable means, such as angled strips 104. In the case of only one table being operated, either chamber may be closed off if desired. The air box is provided with exterior, vertically-disposed walls 107 and 108, and with a top 109, a bottom 110, a front wall 116 and a rear wall 115 (Fig. 5). Air pervious walls 111 and 112 are provided from the tops of the partitions 100 and 101 up to the top 109 of the air box.

Partitions 113 and 114 beneath the frame channel bars constitute with the air chamber structure, passages on either side communicating with the air ducts 98 and 99. There are rock discharging openings 117 and 118 in the front wall 116, in line with the two chambers formed between the partitions 100 and 103 and 103 and 101 respectively.

Pressure regulating devices or closures (Fig. 5) for the discharge openings 117 and 118 are preferably provided, and as shown doors 123, respectively, are provided, having hinges 124 above the openings, the doors thus swinging to and fro to open and close these openings. The pressure regulating means, as embodied, constitute pins 126 extending outwardly from the doors, and carrying removable weights 127, which may be varied in number to vary the pressure.

Means may be provided for regulating the amount of air action through the air pervious walls 111 and 112, and as provided, two vanes or baffles 131 and 132 are within the air chambers at either side of the air box, and are fixed at their upper edges, respectively, to shafts 133 and 134 at the top of the air box.

The shafts 133 and 134 extend exteriorly to the air box, and are provided, respectively, with arms 135 and 136 fixed thereto. Pivotally connected to the ends, respectively, of these arms are links 137 and 138, the other ends of which are pivotally connected to a lever 139, on either side of its pivotal support 140, upon a block 141. A suitable detenting and positioning plate 142 is provided for the lever 139. Thus the quantity and intensity of the air action may be regulated as desired.

The table is reciprocated or vibrated through a relatively short path, of regulable variable length, substantially in the plane of the table, and the table is preferably inclined slightly upwardly and forwardly. The embodied form of means for mounting and reciprocating the table (Figs. 1, 2, 5, 6 and 7), comprises a plurality of short, pivotally mounted arms by which the table is suspended from a plurality of supports. As embodied, a plurality of blocks 165 are bolted or otherwise secured to the various table frame beams, and fixed in these blocks are corresponding stub shafts 166. The outer ends of stub shafts 166 are hung in bearings near the lower end of split, pivotally-mounted, supporting links 167, which links are fastened together by bolts 168. The links 167 are pivotally supported on pins 170, with intervening sleeve bushings 171.

The pins 170 are fixed in, and project from, blocks 172, which blocks are slidable in guides in split pedestals 173, mounted on piers 174. The embodied means for variably vertically positioning the blocks 172, and thereby varying the inclination of the table, comprises screw rods 179 threaded into screw-threaded apertures in the tops of the blocks 172. Washers 180 encircle the respective screw rods 179, and rest on top of the pedestals 173. Lock nuts 181 are screw-threaded on to the screw rod 179 above the washers 180 and by turning these nuts, the block 172 is slid either downwardly or upwardly, to regulate or vary the inclination of the table.

The embodied form of means for vibrating the table (Figs. 1 and 2), cooperating with the mounting just described, comprises a flexible connecting link 200, bolted to a plate or bracket 201, fixed to the rear frame of the table. The flexible connection 200 extends downwardly and backwardly through a passageway boxed out of the center of the air duct 69, and this connecting link at its lower edge is bolted to an eccentric strap 202, mounted on an eccentric 203, fixed on a shaft 204. The shaft 204 is journaled in suitable support, and is driven by any convenient kind of power-transmitting and reduction gearing, or other connections 206, from a motor 207. This mechanism gives a relatively very short and rapid vibration to the table substantially in the plane thereof.

Means are also provided (Figs. 1, 2 and 5) for equalizing the load and preventing slamming of the table, and as embodied, a cross bar 215, preferably consisting of a pair of channel bars, back to back, is fixed to, and extends between, the front ends of the frame bars 33 and 34. There is at this point, at either side, in line with cross bar 215, preferably one of the table suspensions already described. In front and behind the cross frame 215 are two helical springs 216 and 217 alined by pins projecting from either side of the beam 215 and within the spring. At their opposite ends, respectively, the springs encircle the inner ends of screw rods 218 and 219, and abut on stop plates 220 and 221 fixed on the screw rods.

The screw rods, respectively, are screw-threaded into blocks 224 and 225, and project from the outer faces thereof, and are provided, respectively, with squared turning ends 226 and 227. The two blocks 224 and 225 are vertically slidable in supporting and guiding frames 230 and 231 fixed to and projecting upwardly from a foundation block, and are connected by suitable means to screw-rods 232 and 233, which are screw-threaded into nuts 234 and 235 resting on top of the member 230 and 231. Thus by turning the nuts 234 and 235, the mechanism may be adjusted up and down, and by turning the screw rods 218 and 219, the resistance of the two springs 216 and 217 may be regulated.

Means are provided whereby a regulably variable volume of the intermixed divided material is supplied to the table 1 (Figs. 1, 9 and 10), so that a bed of material of the desired thickness may be built up thereof and may thereafter be maintained continuously as the separating action proceeds. In the embodied form, a hopper 245 of any suitable form may be provided, which is shown with a fuel-supplying opening 246 at the bottom thereof, this opening delivering the fuel on to a rotating feeding member 247. This member comprises a plurailty of blades 248, preferably tangentially disposed, and fixed to circular heads 249 and 250 at either end thereof, these heads being fixed to a shaft 251, journaled in the general structure in any suitable way.

In Fig. 9, two such devices are shown side by side, feeding onto the two tables separately. While a common driving means is shown for the two, it will be understood that a separate driving means, and speed regulating means, might be provided for each. As embodied, the shaft 251 is driven from a motor 253 through a speed reducing and regulating mechanism 252, which may be of any desired or convenient kind.

The embodied form of means for gathering the delivered coal, or other lighter material, comprises a horizontally-disposed shelf 265, preferably provided along the delivery edges 15 and 22 of the table. This shelf is fastened at its inner end to the frame structure, and its outer end is supported by bracket arms 266. This shelf preferably runs from the rear or beginning end of the delivery edge and extends along the edge 15, inclined forwardly and outwardly, and then along the edge 22, inclined forwardly and inwardly and terminates at the short inner retaining walls 267 and 268 of the inner side of the rock conduit, directly in front of the air box.

Figure 4:
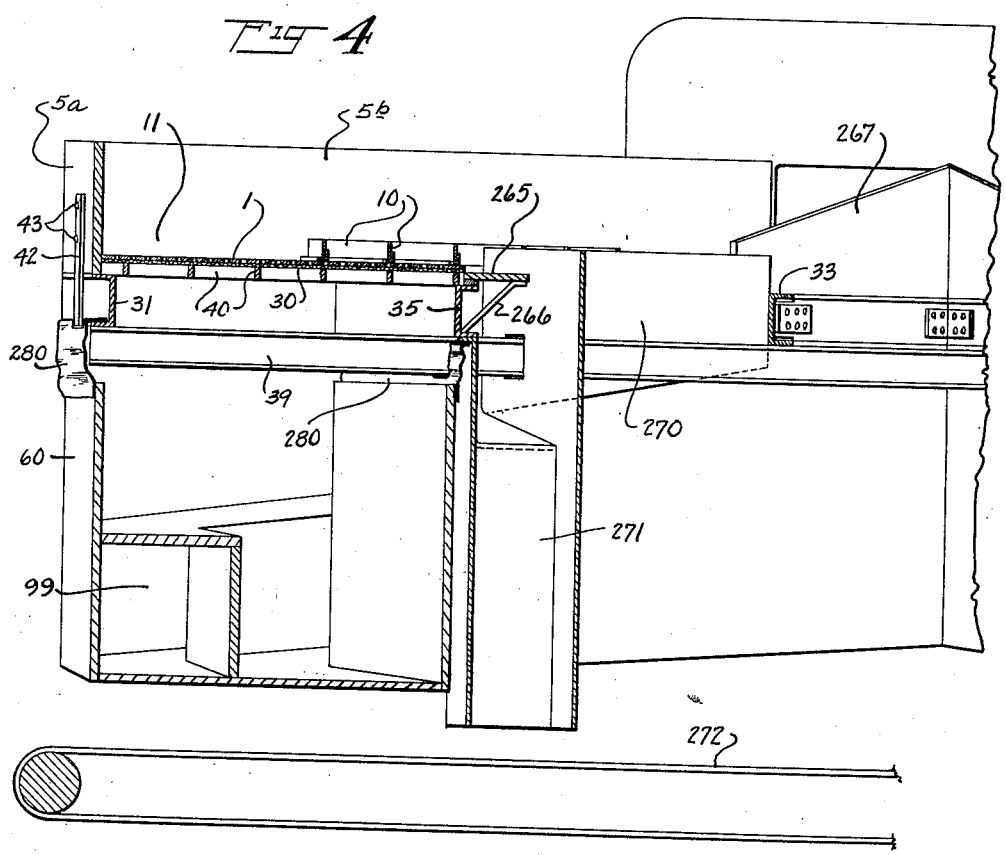
Fig. 4 is an enlarged vertical section on the line 4—4 of Fig. 2, looking in the direction of the arrows.

Inside and beneath the outer edge of the shelf 265 is a chute 270, which is inclined downwardly and forwardly from the beginning of the delivery edge 15 and downwardly and rearwardly from the forward end of the delivery edge 22. This inclined chute terminates in a vertically-disposed, downwardly-discharging chute 271 (Figs. 2 and 4). This chute delivers the coal to any suitable or convenient conveying belt 272, shown more or less conventionally in Figs. 2 and 4.

The rock which is delivered from door 123 falls upon a conveying belt 274, likewise of any convenient structure and shown conventionally in Fig. 2.

In Fig. 12 a short V-shaped separating partition 275 is shown at the forward end of the common partition wall 3 between the two tables, when arranged in the form of Fig. 2, which may be used, if desired, although its use is optional.

The two tables which are shown arranged in relative right-hand and left-hand positions in the preceding figures, and especially in Fig. 2, are both shown in Fig. 13 with similar portions of the two tables arranged in parallel relation to each other. While the tables operate in the same manner when thus arranged, it will be obvious that this is not as convenient an arrangement, as in the preceding structure wherein a common delivery is provided for both tables.

The present preferred arrangement of zones or areas of relative air perviosity is diagrammatically illustrated in Fig. 11, the areas or zones of greatest air perviosity being indicated by *a* and decreasingly by the various letters down to *f* which represents the least degree of air action or air perviosity. The relation of the zones or areas of varying air perviosity to the arrangement and position of the separating partitions, as at present preferred, will be understood by reference to the two sides of Fig. 11, one side showing the partitions and the other side a diagram of the air zoning. It will thus be seen that the area of greatest air action is at the rear of the table and preferably entirely across the table. It will be also noted that the air action decreases both forwardly along the table, and also toward the direction of discharge of the lighter and superior stratified material, but that the areas of greatest air action are relatively larger. Also, preferably, the air action increases forwardly along the table beyond the place of discharge of the lighter material, the air acting in its full power or intensity just in front of and through the air box at the front end of the table.

The manner of operation of the table is substantially as follows:—

It will be assumed that a bed of the intermixed materials has been built up on the table, and the separating process is in its full or normal state of operation. The intermixed materials are fed at the desired rate of degree, preferably entirely across the rear end of the table, thus replenishing the bed with the intermixed materials at the rate that the separated materials are fed off and delivered from the forward end of the bed.

The bed of materials is continuously vibrated through a short path substantially in the plane of its inclination and is subjected to the air action. As the material is fed onto the table and subjected to the upwardly moving air currents, the particles of the material are separated from each other, and thereby have freer movement in obedience to the forces acting upon them. The force of the air currents is regulated so that the lighter material is either maintained in an upward relative position, or is impelled upwardly, and this is probably also true of the smaller pieces of the relatively heavier material, but the larger pieces of the relatively heavy material will immediately sink to rest upon the table.

Immediately any piece of the heavier material comes to rest upon the table it is subjected to the action of inertia and friction to propel it forwardly along the table by a short path to the side edge of the table practically out of the bed, and thence along the outer wall of the table. Due to the disposition of the separating partitions extending both forwardly and outwardly, the pieces of heavier material at rest upon the table are immediately propelled outwardly to the outer side wall, and thus are practically completely separated and disposed of out of possibility of future involvement in the bed of material undergoing separation.

As the material progresses along the table and the air pressure decreases somewhat, the next larger pieces of the heavier material will settle upon the table or will sink below the level of the top edge of the separating partitions, and will thereby be constrained and directed transversely outwardly and forwardly along the table in the proper direction, even preceding their settlement upon the table. They will eventually settle on the table, and being subject to the action of inertia and friction, will be quickly impelled into the passageway 11 and travel straight down the outer edge of the table.

It will be noted that there is preferably quite a distance longitudinally of the table during which no material is delivered, but the process of stratification proceeding, the lighter material being more and more completely stratified, and remaining flotant, while the heavier material is progressed transversely and forwardly into a stream flowing along the outer edge of the table.

The superior flotant stratum of lighter material flows in a straight stream down the table in the direction of movement of the table, and in the direction of the general motion of the bed, and is not subjected to any disturbing influence or action which would tend to again intermix it. This stream gradually begins to flow over the rear end of the delivery edge 15, at the point most distant across the table from the stream of forwardly traveling rock or other heavier material, and where the stratification and separation has naturally most nearly reached completion.

As the material flows along the table into areas of less intense air activity, even the finest particles of rock, or other heavier material, will sink upon the table, and due to the action of friction and inertia, and the directive constraint of the separating partitions, is progressed outwardly into the stream of rock flowing along the outside edge of the table.

The delivering edge 15 extends outwardly transversely to a distance sufficient to catch and spill practically all of the superior flotant stratum of coal, or other lighter material, this occurring up to and prior to the point 17 in Fig. 2. From this point on the action is somewhat different due to the change in the angle or shape of the table, and the action is practically the reverse of what has already taken place and been described. The relative amount of lighter material is now very small, and most of the material passing along this narrow part of the table is rock.

The air action in this final stretch or reach of the table tends to blow the lighter material backwardly, while the rock is urged forwardly in contact with the outer wall 5$^b$, and is restrained thereby. The lighter material, that is, the coal, is propelled backwardly and over the delivery edge 22. The rock is very little disturbed at this point, due to its being in the bottom stratum, and is naturally least responsive to the air action, thus remaining in its place and sliding along toward delivery. However, if any of the smaller particles of rock near the top of the layer are blown backwardly toward the edge 22, they will come to rest on the table before reaching that edge, and will be again impelled forwardly and outwardly by the directive restraint of the short separating partitions 10 into the stream of rock flowing along the channel inside the wall 5$^b$. There will thus be at this point a practically complete final separation of the small remaining quantity of coal from the rock.

The air box at the forward end of the table is designed to effect the final separation of any relatively small remainder of coal which may remain in the great quantity of rock, although this will be almost inconsequential in quantity. The force of the air through the ducts 98 and 99 may be regulated as desired, and may be further regulated by the valves 131 and 132. Thus a more or less powerful air current is blown in through the top of the air box and backwardly into the upper part of the material in the box, mostly rock, and through the material and toward the rear of the table. This will blow back any small residue of coal, and it will come into the zone of action over the delivery edges 22 and be delivered with the coal.

A dust collector will be employed in practically all commercial installations, and such a device is shown in part in Figs. 1 and 14, and may be of the general form of that shown in my copending application Ser. No. 628,921, filed March 30, 1923. The body of the dust collector 281 has a flexible, air-tight, curtain 282 dependent therefrom and extending downwardly about the edges of the table to include and draw upwardly all the dust. The body of the dust collector comprises the upwardly expanding portion 283 through which the dust laden air passes to an outlet 284, the expanded space serving to decrease the velocity of the air currents and thus precipitate the solid particles carried in suspension. Screens 285 of coarse-mesh cloth or other suitable substance through which the air passes, serves as baffles to catch and precipitate the particles which fall into the downwardly inclined collecting chamber 286; which is provided with a suitable trap door outlet 287 for releasing the precipitated dust onto the upper run of a conveying belt 288 which transports the dust to a suitable receptacle. In this embodiment, the forward end of the table extends beyond the dust collector (Fig. 1) as the separating action is nearly completed and but little dust is given off. This affords full and continuous facilities for an attendant to examine the materials on the table, in full and unobstructed view, close at hand, and as frequently and continuously as desired, and he will thereby be enabled to regulate the air action and table reciprocation to get the most efficient results.

The air currents or air pressure action can be regulated to separate the "bony" and deliver it with the rock from the forward end of the table, and the pieces of mixed coal and bony, especially when such pieces are mostly coal can be separated with the coal; and this action can be nicely regulated as desired.

From all the foregoing it will be understood that a process, mechanism and means are provided by the invention, realizing the objects and advantages herein set forth together with other objects and advantages; and it will be further understood that departures may be made from the details of mechanism herein shown and described within the scope of the accompanying claims, limited only as may be necessary by the prior art, without departing from the principles of the invention and without sacrificing its chief advantages.

What I claim is:—

1. The process of separating intermixed divided materials varying relatively greatly in size and relatively little in their specific gravities which comprises acting on a bed of the intermixed materials, supported on an air pervious table, by upwardly directed air currents to loosen the materials and to stratify them by flotation of the lighter material while permitting the heavier material to come to rest on the table, impelling the lighter superior stratified material directly forwardly in a stream straight along the table to a place of discharge at the front while preventing lateral spillage thereof, and directing the inferior heavier material transversely of and to an edge of the table and then along the edge of the table and to a place of discharge.

2. The process of separating intermixed divided materials varying relatively greatly in size and relatively little in their specific gravities which comprises acting on a bed of the intermixed materials, supported on an air pervious table, by upwardly directed air currents, and by longitudinally reciprocating the table, to loosen the materials and to stratify them by flotation of the lighter material while permitting the heavier material to come to rest on the table, impelling the lighter superior stratified material directly forwardly in a stream straight along the table to a place of discharge at the front, confining the bed of materials along the side edges thereof to prevent lateral escape of the lighter material, and directing the inferior heavier material transversely of and to an edge of the table and then along the edge of the table and to a place of discharge.

3. A mechanism for separating intermixed divided materials, varying relatively greatly in size but varying relatively little in specific gravity, including in combination a longitudinally disposed air pervious table supporting a bed of the materials, material separating means comprising devices for forcing air currents up through the bed to stratify the lighter material in a superior stratum and to impel it forwardly unidirectionally along the table to a place of discharge while preventing substantial sidewise movement of said stratum, and for progressing an inferior and heavier material to the side edge of the table, and thence along the side edge of the table, to a place of discharge.

4. A mechanism for separating intermixed divided materials, varying relatively greatly in size but varying relatively little in specific gravity, including in combination a longitudinally disposed air pervious table supporting a bed of the materials, material separating means comprising devices for forcing air currents up through the bed to stratify the lighter material in a superior stratum and to impel it forwardly unidirectionally along the table to a place of discharge and progressing an inferior and heavier material to the side edge of the table to a place of discharge, the table comprising a laterally angled portion to direct the stream of separated heavier material past the place of discharge of the lighter material.

5. A mechanism for separating intermixed divided materials, varying relatively greatly in size but varying relatively little in specific gravity, including in combination a longitudinally disposed air pervious table, means for feeding the intermixed materials to the rear end of the table, separating partitions on the table and inclined forwardly and outwardly to direct a heavier material immediately to the side edge of the table, discharge means for the heavier material, means for forcing air through a bed of the materials on the table, means for longitudinally reciprocating the table, material retaining walls along the side edges of the table for maintaining a bed of materials of substantial depth on the table and for preventing lateral escape of the superior stratum whereby said superior stratum progresses forwardly to discharge at the front of the table, and a discharge edge for the separated lighter material disposed transversely and forwardly of the table for effecting a progressive discharge of the lighter material, the forward ends of the separating partitions terminating short of the side edge of the table to provide an unobstructed channel therealong for the heavier material.

6. A mechanism for separating intermixed divided materials, varying relatively greatly in size but varying relatively little in specific gravity, including in combination a longitudinally disposed air pervious table supporting a bed of the materials, material separating means comprising devices for forcing air currents up through the bed to stratify the lighter material in a superior stratum and to impel it forwardly unidirectionally along the table to a place of discharge and progressing an inferior and heavier material to the side edge of the table to a place of discharge, and a discharge edge for the separated lighter material disposed forwardly and transversely of the table, the forward part of the table being shaped to convey the separated heavier material forwardly beyond the place of discharge of the lighter material.

7. The process of separating intermixed divided materials varying relatively greatly in size and relatively little in their specific gravities which comprises acting on a bed of intermixed materials, supported on an air-pervious table, by upwardly directed air currents, and by longitudinally reciprocating the table, to loosen the materials and to statify them by flotation of the lighter material while permitting the heavier material to come to rest on the table, impelling the lighter superior stratified material directly forwardly in the direction of the reciprocation in a stream straight along the table to a place of discharge at the front while preventing substantial lateral flow thereof, and directing the inferior heavier material transversely of the direction of reciprocation and then parallel to the direction of reciprocation to discharge.

8. The process of separating intermixed divided materials varying relatively greatly in size and relatively little in their specific gravities which comprises acting on a bed of the intermixed materials, supported on an air-pervious table, by upwardly directed air currents, and by longitudinally reciprocating the table, to loosen the materials and to stratify them by flotation of the lighter material while permitting the heavier material to come to rest on the table, directing the inferior heavier material in divergent paths transverse to the direction of reciprocation to leave the lighter superior stratified material centrally disposed with respect to the heavier material, and impelling said lighter superior stratified material directly forwardly in the direction of reciprocation to a place of discharge at the front of the table and moving the separated heavier materials forwardly to discharge in streams substantially parallel to the central stream of lighter material.

9. A mechanism for separating intermixed divided materials including in combination a relatively long and narrow air-pervious deck inclined upwardly from the rear toward the front end thereof and having a plurality of substantially parallel separating partitions thereon extending forwardly and transversely along the deck surface, means for reciprocating the deck in the direction of its length, means for maintaining thereon a bed of the materials undergoing separation, a longitudinally-disposed bed-retaining wall along one side of the deck adjacent the forward ends of the separating partitions, the forward ends of the separating partitions being spaced from said wall so as to leave a substantially unobstructed passageway extending longitudinally of the deck between the separating partitions and the bed-retaining wall for the passage of settled heavier material delivered by the separating partitions, a second bed-retaining wall on the other side of the deck extending from the rear end of the table forwardly for a shorter distance than said first mentioned bed-retaining wall, a spillage edge for the lighter material extending diagonally across the deck from the forward end of said second bed-retaining wall toward the opposite side of the deck but stopping short thereof and a laterally-angled portion of the table extending beyond the forward termination of said diagonal spillage edge for directing the stream of settled heavier material beyond the place of discharge of the lighter material.

10. A mechanism for separating intermixed divided materials including in combination a relatively long and narrow air-pervious deck having a plurality of substantially parallel separating partitions thereon extending forwardly and transversely along the deck surface, means for reciprocating the deck in the direction of its length, means for maintaining thereon a bed of the materials undergoing separation, a longitudinally-disposed bed-retaining wall along one side of the deck adjacent the forward ends of the separating partitions, the forward ends of the separating partitions being spaced from said wall so as to leave a substantially unobstructed passageway extending longitudinally of the deck between the separating partitions and the bed-retaining wall for the passage of settled heavier material delivered by the separating partitions, said passageway being of greater width toward the front end of the deck, a second bed-retaining wall on the other side of the deck extending from the rear end of the table forwardly for a shorter distance than said first mentioned bed-retaining wall, a spillage edge for the lighter material extending diagonally across the deck from the forward end of said second bed-retaining wall toward the opposite side of the deck but stopping short thereof and a laterally-angled portion of the table extending beyond the forward termination of said diagonal spillage edge for directing the stream of settled heavier material beyond the place of discharge of the lighter material.

11. A mechanism for purifying coal including in combination a pair of relatively long and narrow air-pervious decks decreasing in width forwardly, means for longitudinally reciprocating the decks together, bed retaining walls along the outer side edges of the decks and extending from the rear to the front ends thereof, separating partitions for directing settled heavier material outwardly along the decks toward the bed retaining walls, and a common interiorly disposed discharge space for receiving lighter material from both decks.

12. A mechanism for purifying coal including in combination a pair of relatively long and narrow air-pervious decks decreasing in width forwardly, means for longitudinally reciprocating the decks together, bed retaining walls along the outer side edges of the decks and extending from the rear to the front ends thereof, separating partitions for directing settled heavier material outwardly along the decks toward the bed retaining walls, means for maintaining the material on one deck separate from that on the other, and a common interiorly disposed discharge space for receiving lighter material from both decks, and a common dust collecting chamber above both decks and overlying said interior discharge space.

13. A mechanism for separating intermixed divided materials including in combination a pair of relatively long and norraw air-pervious decks decreasing in width forwardly, means for longitudinally reciprocating the decks together, bed retaining walls along the outer side edges of the decks and extending from the rear to the front ends thereof, separating partitions for directing settled heavier material outwardly along the decks toward the bed retaining walls, unobstructed longitudinal passageways for heavier material between the bed retaining walls and the outer ends of the separating partitions on either deck, and a common interorly disposed discharge space for receiving lighter material from both decks.

14. A mechanism for separating intermixed divided materials including in combination a longitudinally reciprocable frame, a pair of relatively long and narrow air-pervious decks mounted on the frame, each deck narrowing forwardly from the rear to the front end thereof, a common air chamber beneath the decks for supplying lifting and loosening air currents to the decks, bed retaining walls disposed along the outer side edges of the decks and extending from the rear to the front ends of the decks, each deck having a plurality of separating partitions disposed forwardly and outwardly on the deck but terminating short of the outer retaining walls so as to provide unobstructed passageways for heavier material along the outer sides of the decks, longitudinally extending spillage edges for lighter material along the inner sides of the decks providing a common interior discharge space between the two decks, and common conveying means for receiving and carrying away the lighter material from the spillage edges of both decks.

15. A mechanism for purifying coal including in combination a relatively long and narrow, air-pervious deck which is longitudinally reciprocable and is inclined upwardly from its feed to its delivery end, means for feeding intermixed materials to the rear end of said deck, a retaining wall along one side edge of the deck for preventing spillage of heavier material thereover, a plurality of side-by-side separating partitions extending forwardly and transversely toward the retaining wall but terminating short thereof, the front portion of the deck comprising an angularly-disposed arm, an unobstructed pathway for settled heavier material extending along the deck and angularly-disposed arms between the retaining wall and the ends of the separating partitions, means for delivering settled heavier material from the angular arm and means for delivering a flotant stratum of lighter material to the rear of said arm.

16. A mechanism for purifying coal including in combination a relatively long and narrow, air-pervious deck which is longitudinally reciprocable and is inclined upwardly from its feed to its delivery end, means for feeding intermixed materials to the rear end of said deck, a retaining wall along one side edge of the deck for preventing spillage of heavier material thereover, a plurality of side-by-side separating partitions extending forwardly and transversely toward the retaining wall but terminating short thereof, the front portion of the deck comprising an angularly-disposed arm, an unobstructed pathway for settled heavier material extending along the deck and angularly-disposed arm between the retaining wall and the ends of the separating partitions, means for delivering settled heavier material from the angular arm and means for delivering a flotant stratum of lighter material to the rear of said arm comprising a spillage edge disposed forwardly and transversely toward the outer retaining wall but terminating short thereof.

17. An improved deck for the dry separation of a mass of material composed of particles having different characteristics, comprising a pervious deck having one side straight and constructed to prevent the heavy materials from flowing over said straight side, said deck inclined forwardly and upwardly from its feed to its delivery end, the deck provided with a plurality of forwardly projecting riffles stopping before reaching the said side, thereby forming an unobstructed portion extending parallel to the said side, the delivery end of the deck having an arm projecting in a direction away from the straight side and the arm provided with a plurality of parallel riffles extending forwardly and stopping before reaching the upper side of said arm forming an unobstructed concentrating space, said deck having its side opposite to the straight side formed substantially V-shaped, whereby the heavy particles are concentrated against and travel along the straight side and in the space at the upper side of said arm and the lighter materials flow in a direction away from the straight side and away from the space formed on the arm, thereby effecting separation of the heavy and light particles composing the mass.

18. A mechanism for separating intermixed divided materials including in combination a relatively long and narrow, air-pervious table which is reciprocable longitudinally, said table being inclined longitudinally upwardly toward its front end, a retaining wall along one side edge of the table, separating partitions inclined forwardly and toward said retaining wall, an unobstructed longitudinal passageway for settled heavier material along the retaining wall, the forward end portion of the table extending angularly in a direction reverse to that of the direction of inclination of the separating partitions.

19. A mechanism for separating intermixed divided materials including in combination a relatively long and narrow, air-pervious table which is reciprocable longitudinally, said table being inclined longitudinally upwardly toward its front end, a retaining wall along one side edge of the table, separating partitions inclined forwardly and toward said retaining wall, an unobstructed longitudinal passageway for settled heavier material along the retaining wall, the forward end portion of the table extending angularly in a direction reverse to that of the direction of inclination of the separating partition, the side retaining wall and the unobstructed passageway extending along said angled portion.

20. A mechanism for separating intermixed divided materials including in combination a relatively long and narrow, air-pervious table which is reciprocable longitudinally, said table being inclined longitudinally upwardly toward its front end, a retaining wall along one side edge of the table, separating partitions inclined forwardly and toward said retaining wall, an unobstructed longitudinal passageway for settled heavier material along the retaining wall, the forward end portion of the table extending angularly in a direction reverse to that of the direction of inclination of the separating partition and an inclined spillage edge for lighter material to the rearward of said angled portion.

21. A mechanism for purifying coal including in combination a pair of relatively long and narrow air-pervious decks decreasing in width forwardly, means for longitudinally reciprocating the decks together, bed-retaining walls along the outer side edges of the decks and extending from the rear to the front ends thereof, separating partitions for directing settled heavier material outwardly along the decks toward the bed-retaining walls, a common interiorly disposed discharge space for receiving lighter material from both decks, said discharge space being formed by a forwardly and outwardly inclined spillage edge on each deck.

22. A mechanism for purifying coal including in combination a pair of relatively long and narrow air-pervious decks, means for longitudinally reciprocating the decks together, means for maintaining a bed of coal traveling along the deck and undergoing purification thereon, means for passing lifting and loosening air currents through the bed, means for directing settled heavier material along the surface of the decks to discharge, said decks being adjoined for a substantial portion of their length and provided with divergent coal spillage edges to form a common, interiorly-disposed discharge space for lighter material between the decks, and means for progressing all flotant lighter material on both decks to said common discharge space.

KENNETH DAVIS.